Figure 1:
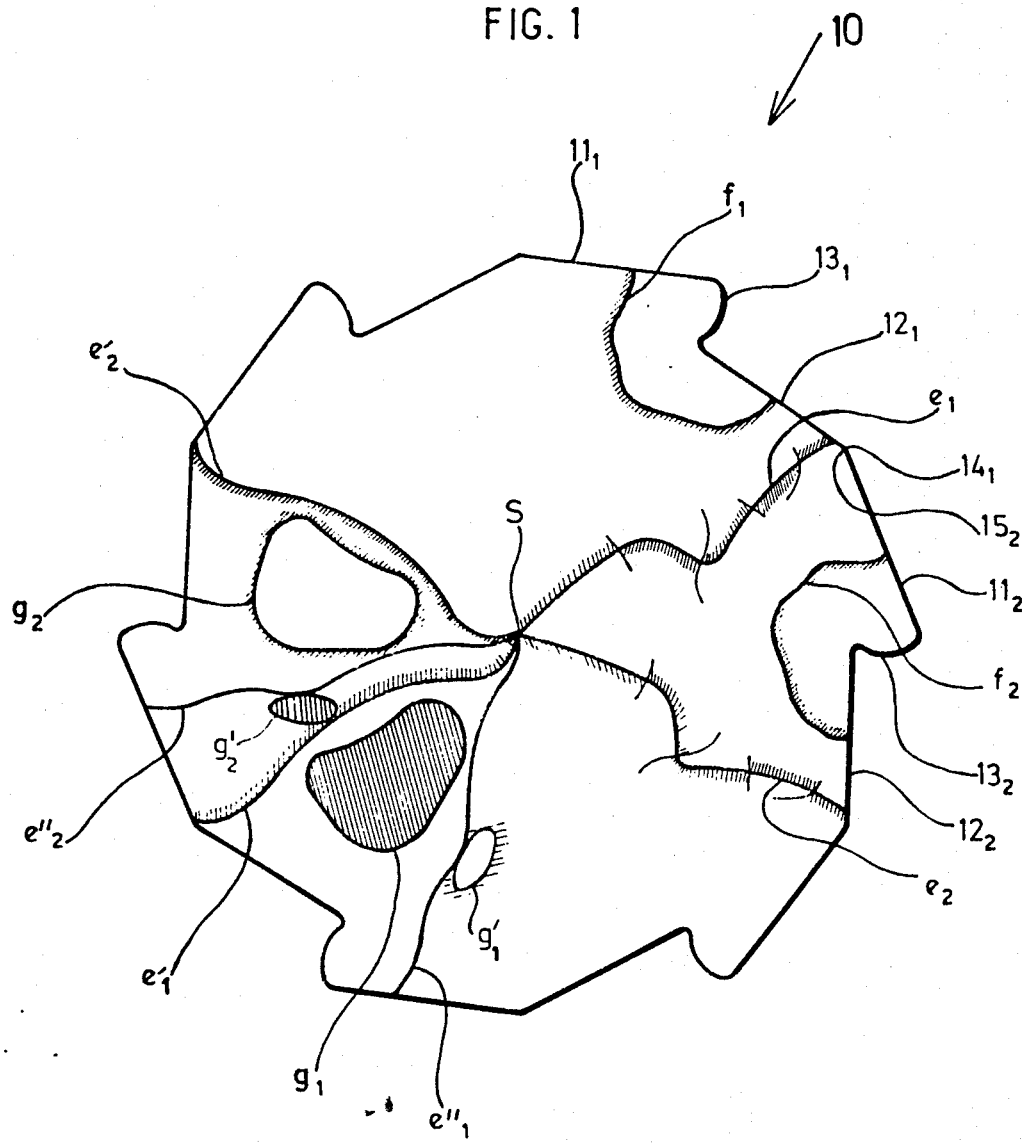

[72] Inventor André J. Girard
Chatillon-sous-Bagneux, France
[21] Appl. No. 860,738
[22] Filed Sept. 24, 1969
[45] Patented Oct. 5, 1971
[73] Assignee Office Nationale D'Etudes et de Recherches Aerospatiales (par abreviation O.N.E.R.A.) Chatillon, S/Bagneux, France
[32] Priority Oct. 1, 1968
[33] France
[31] 168279

[54] WINDOW FOR SPECTROMETERS
3 Claims, 12 Drawing Figs.
[52] U.S. Cl.................................................. 350/271, 356/74, 356/98
[51] Int. Cl. ................................................... G01j 3/04, G01i 3/32
[50] Field of Search........................................... 356/74, 96–101; 250/237; 350/271; 250/237

[56] References Cited
UNITED STATES PATENTS
| | | | |
|---|---|---|---|
| 3,305,692 | 2/1967 | Girard | 250/237 |
| 3,343,446 | 9/1967 | Girard | 356/74 |
| 3,383,978 | 5/1968 | Girard | 356/96 |

Primary Examiner—Ronald L. Wibert
Assistant Examiner—F. L. Evans
Attorney—Karl F. Ross ABSTRACT: A radiation gate or window for a spectrometer, in which two such gates are relatively rotatable at the input and output ends of a ray path traversing a dispersive system, has a multiplicity of zones of different conveying characteristics (transparent and opaque or reflective) forming a plurality of identical sets which are mutually transposed, by an angle representing an aliquot fraction of a circle, with reference to a common center. In one embodiment the zones are bounded by identical, angularly offset spirals originating at the center of rotation, the spacing between adjacent spirals diminishing progressively with increasing distance from the center.

ANDRÉ, JEAN GIRARD
INVENTOR

BY Karl F. Ross
ATTORNEY

WINDOW FOR SPECTROMETERS

My present invention relates to a window for spectrometers.

In my prior U.S. Pat. Nos. 3,211,048, 3,383,978, 3,343,446 and 3,539,261 I have disclosed spectrometric gates or windows which show on their operative surface two multiplicities of zones with different conveying properties (transparency, opacity, or reflection), the pattern of the zone boundaries being nonrepetitive in the direction in which the spectrum is spread out; thus, if two identical windows are superimposed, there does not exist a relative position of the two windows in which several zone boundary lines are superimposed, except for the relative position of the two windows in which all the zone boundary lines of one window are superimposed on the zone boundary lines of the other window.

When a spectrometer fitted with two such windows, located at the entrance and exit pupils respectively, receives a monochromatic radiation, and when its dispersive system is adjusted to the wavelength of that radiation, the images of the zone boundary lines of the entrance window are superimposed on the zone boundary lines of the exit window whereas for radiation with a different wavelength, the pattern of the images of the zone boundary lines of the entrance gate is shifted, with respect to the zone boundary lines of the exit window, in the direction in which the spectrum is spread out, and there is no image of an entrance zone wholly superimposed on a zone of the exit window.

Some of these spectrometers include means for optical commutation, which alternately replace an entrance or an exit window by its complementary pattern, i.e. by a window identical therewith, except for a reversal of the conveying characteristics of the zones.

Spectrometers of another type, e.g. as disclosed in my prior Pat. No. 3,383,978, include means to vibrate the image of the entrance window with respect to the exit window, in a direction perpendicular to the direction in which the spectrum is spread out.

Spectrometers of a third type, also described in U.S. Pat. No. 3,383,978, include means to rotate the image of the entrance window with respect to the exit window.

In all these spectrometers a detector sensitive to radiation receives the outgoing flux; this detector is connected to an alternating-current amplifier tuned to the commutation, vibration or rotation, frequency.

It is an object of the invention to provide an improved spectrometer or spectrograph window which is particularly designed for instruments of the third type referred to above (i.e. those with relative rotation of the two windows) but which may nevertheless be used, in numerous cases, in spectrometers belonging to the first or the second type.

Windows suited to fit spectrometers of the aforementioned third type generally include zone boundary lines which are circles centered on the axis of rotation.

In particular, it is an object of the invention to provide such windows producing, from a radiation flux with a wavelength equal to that for which the dispersive system is adjusted, a signal which may be particularly easily and efficiently exploited.

Likewise it is an object of the invention to provide a window which, when used as a stationary window in a spectrometer, provides, in cooperation with the rotating image of the other window or vice versa, good results without needing a precise angular adjustment of the stationary window.

It is also an object of the invention to provide such a window which may be used directly in a spectrometer of the first or the second aforementioned type without requiring, in particular, a precise angular adjustment with respect to the spectrum spread direction in which the spectrum is spread out.

Figure 12:
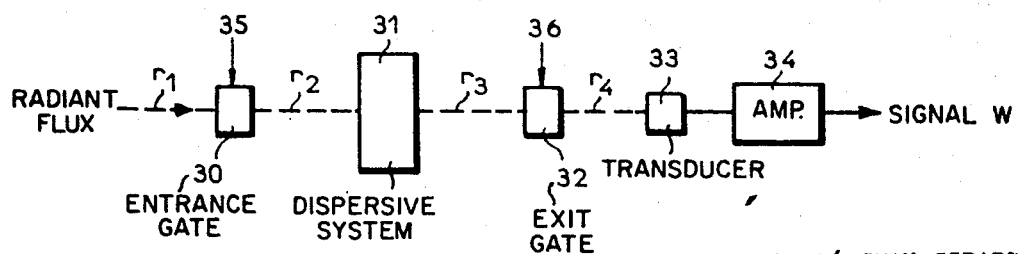

In the following description, given by way of illustration, I shall refer the appended drawing, in which:

FIG. 1 is a very schematic view of a window according to the invention, serving to explain the generation of its patten;

FIGS. 2 to 11 are very schematic views of windows according to the invention according to various embodiments; and FIG. 12 is a diagrammatic view of a spectrometric apparatus utilizing such windows Reference is first made to FIG. 1 which shows very schematically a window according to the invention having a contour 10, made up of straight segments 11, 12, or curved segments 13, which have an even-order symmetry in the crystallographic sense: segment $11_2$ is derived from segment $11_1$ by a rotation of $\pi/N$ radians around the center S, N being an integer; segment $12_2$ is derived from segment $12_1$ by the same rotation, and segment $13_2$ is similarly derived from segment $13_1$ the terminal $14_1$ of segment $12_1$ being coincident with the origin $15_2$ of segment $11_2$.

I than draw an odd number of paths such as $e_1, e'_1, e''_1$, connecting the center S with some points of the contour; these paths are mutually independent, i.e. they do not have any common segment, although they may have in common points of contact, points of intersection, or cusps; furthermore these paths are rotationally nonrepetitive, i.e. it is not possible to derive one path, e.g. $e''_1$, from another path by a rotation around the center S. The set of paths $e_1, e'_1, e''_1$ recurs graphically with an angular spacing of $\pi/N$ radians; thus the combination of the several sets exhibit a rotational symmetry of order 2N. As an example, a second set is shown which is made up of a path $e_2$, derived from path $e_1$ by a rotation of $\pi/N$ radians, a path $e'_2$ derived from path $e'_1$ by the same rotation, and a path $e''_2$ derived from path $e''_1$ by the same rotation.

I may also draw out a first curve $f_1$, which is a line connecting two points of the contour 10 without passing through the center S. From curve $f_1$ I derive another curve $f_2$ by a rotation of $\pi/N$ radians. Further curves, not shown in the Figure, make up together with curve $f_1$ a set of rotationally nonrepetitive curves; similar sets of curves (one of them including the curves $f_2$) are derived from this set by successive rotations of $\pi/N$ radians.

Different conveying properties are assigned to the zones defined by the network of paths and curves, in such a way that these properties differ on opposite sides of a line defining such a path or curve.

I may also draw sets of closed loops such as a first set $g_1, g'_1$, etc. and a second set of loops $g_2, g'_2$, etc. derived from the first set by a rotation of $\pi/N$ radians.

The above-mentioned condition relating to the different conveying powers of two zones bounded by a line, indicated diagrammatically by shading, is also valid for the areas bounded by these loops.

The pattern of zone boundaries constituted by the sets of paths, curves and loops is translationally nonrepetitive in at least one direction.

A pair of windows thus formed may be used in a spectrometer, one of the windows moving in its plane, either rotating around its center, or vibrating; the signal obtained by the detector receiving the radiation delivered by the spectrometer is applied to an alternating-current amplifier tuned to a frequency equal to the frequency of motion of the aforesaid window, or to a multiple of that frequency.

Reference is now made to FIGS. 2 to 11 which diagrammatically show a number of windows which may be put to practical use in such a spectrometer and which satisfy the conditions defined above.

Figure 2:
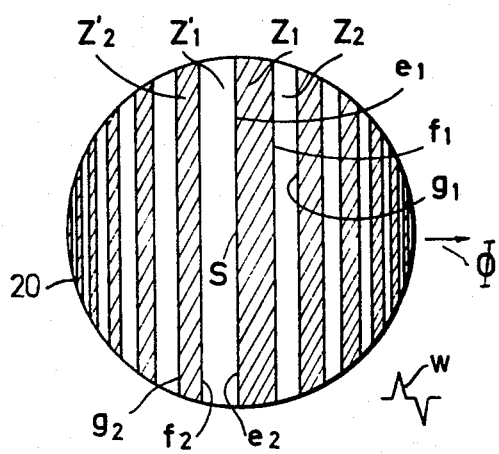

In the embodiment shown in FIG. 2, the window includes a first straight segment $e_1$, and a second segment $e_2$ in line with of the first one, both these segments radiating from the center S; each of these segments constitutes a path connecting the center S with the contour 20. Other zonal boundary lines included in the window are a straight line $f_1$ not passing through the center S, which connects two points of the contour, and a straight line $f_2$ symmetrical to line $f_1$ with respect to the diametric line $e_1$. Another zone boundary is constituted by a straight line $g_1$, parallel to the preceding straight lines, which is at a greater distance from the diameter $e_1$–$e_2$ than line $f_1$; to line $g_1$ corresponds a straight line $g_2$ on the other side of that diameter. The straight lines bound zones $Z_1, Z'_1, Z_2, Z'_2$, etc., which are alternately transparent and reflective. The direction in which the spectrum is spread out is shown by the arrow $\Phi$. To achieve the condition of nonrepetitiveness one may, for instance, make the spacings of the zonal boundary lines inversely proportional to the distance from the center or from an extremity of the diameter perpendicular to these lines.

When using two such windows located at the entrance and at the exit of a spectrometer, one of which is fixed while the other rotates around the point S, and when the spectrometer receives a monochromatic radiation with a wavelength equal to that for which the dispersive system is adjusted, one obtains, from the detector receiving the exit flux, an output signal W shown diagrammatically and on a very small scale in the lower right-hand corner of FIG. 2.

Figure 3:
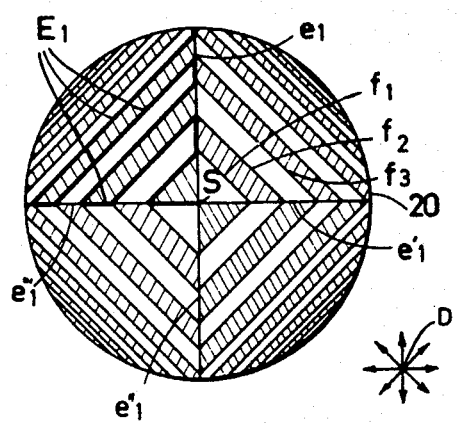

Reference is now made to FIG. 3. The contour 20 of the window is again a circle. From the first line $e_1$, which is a straight line connecting the point S with a point of the circumference 20, I obtain by a rotation of $\pi/2$ another zone boundary line $e'_1$, then by a second rotation of $\pi/2$ another zone boundary line $e''_1$, then by a further rotation of $\pi/2$ another zonal boundaries $e'''_1$. Other zone boundary lines are constituted by parallel oblique lines $f_1, f_2, f_3$, including an angle of 45° with the lines $e_1$ and $e'_1$ which they connect. The distances between lines $f_1, f_2$, etc. follow, for instance, a law similar to that of lines $f_1, f_2$, etc. of FIG. 2. The zone boundary lines of the three other quadrants are obtained by a $\pi/2$ rotation around the center S of the lines $f_1$, etc., drawn in the first quadrant. Moreover the set of lines thus laid out exclusive of the oblique lines connecting two points of the contour, constitutes a set of four independent meandering paths, such as the path E, traced in heavy lines in the Figure, each of which connects the center S with the contour 20; these paths are derived from one another by a rotation of $\pi/4$ radians.

A spectrometer fitted with windows according to FIG. 3 works in a manner similar to that above described. However, for the same rotary velocity of the entrance or the exit window, the peaks shown by the output signal are occur at twice the frequency of those obtained with a spectrometer fitted with a window according to FIG. 2. The stationary window may be oriented with respect to the direction of spectrum spread in several possible ways or indicated at D in the lower right-hand corner of FIG. 3.

Figure 4:
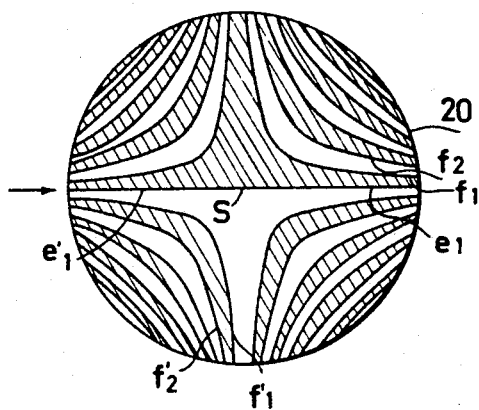

Reference is now made to FIG. 4. In this embodiment, a radial line $e_1$ again connects the center S with a point of the circular contour 20; as in FIG. 2, a line $e'_1$ is derived from line $e_1$ by a rotation through an angle $\pi$ around S. Another zone boundary is constituted by an arc $f_1$ of an equilateral hyperbola connecting two points of the contour 20, which belongs to a family of equilateral hyperbolae asymptotic to the line $e_1$–$e'_1$ and to a diameter perpendicular thereto. Another zone boundary $f'_1$ is obtained by rotating the arc $f_1$. Other zone boundary lines are constituted by a second hyperbola $f_2$ of the aforesaid family, and by its mirror image with respect to the point S, $f'_2$, etc. The stationary window of the pair of windows thus made up is set up so that the asymptote $e_1$–$e'_1$ is parallel to the direction in which the spectrum spreads out, as indicated by the arrow in FIG. 4.

Figure 5:
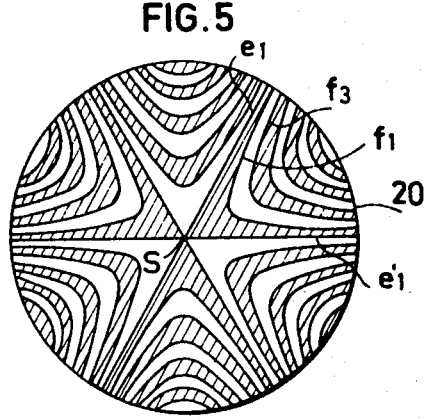

Reference is now made to FIG. 5. In this embodiment, a zone boundary line is the straight line $e_1$, drawn out from the center S to a point of the circumference 20; another zone boundary line is an arc of hyperbola $f_1$ connecting two points of the contour 20, which is located between line $e_1$ and a straight line $e'_1$ derived from $e_1$ by a rotation of $\pi/3$; $f_2$ is another zone boundary line constituted of an arc of hyperbola which belongs, as does the arc $f_1$, to the family of hyperbolae asymptotic to radii $e_1$ and $e'_1$, etc. From the sectoral pattern thus laid out, with an apex angle equal to $\pi/3$, a second sectoral pattern is derived by a rotation of $\pi/3$, etc.; here the symmetry is of order 6, i.e. N is equal to 3. As in all the preceding embodiments, the zones defined by the zone boundary lines have alternately different conveying characteristics.

Figure 6:
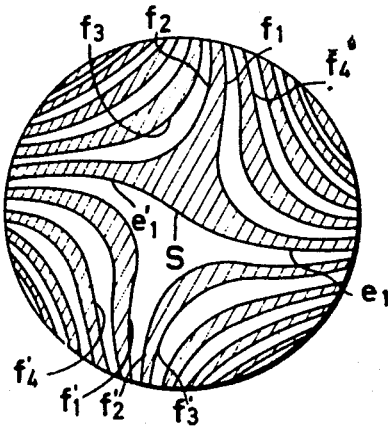

Let us now refer to FIG. 6. In this embodiment, line $e_1$ is a curve connecting the center S with a point of the circumference, and line $e'_1$ is obtained from line $e_1$ by a rotation of $\pi$; $f_1$ is a curved line asymptotic to the curve $e_1$ and to a curve (not shown in the Figure) which is derived from curve $e_1$ by a rotation of $\pi/2$ radians; the line $f_1$ connects two points of the contour and does not pass through the center S; there exist other zone boundary lines $f_2, f_3, f_4$, having the same asymptotes, and further zone boundary lines $f'_1, f'_2, f'_3, f'_4$, symmetrical thereto with respect to the center S, i.e. derived from the former by a rotation of $\pi$.

Figure 7:
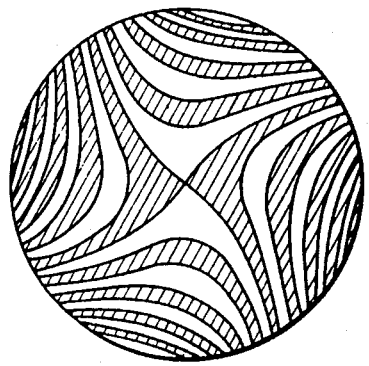

FIG. 7 is a variation obtained in a manner similar to that of FIG. 6.

Figure 8:
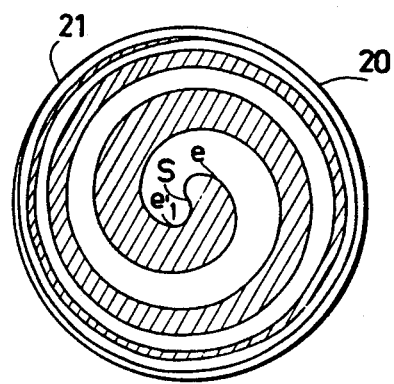

Let us now refer to FIG. 8. In this embodiment, the line $e_1$ is a spiral with the center S as its origin; it constitutes a path which reaches the contour 20 at a point 21. The spiral $e'_1$ is obtained from curve $e_1$ by a central symmetry with respect to S, i.e. by a rotation of $\pi$ around that point. The spiral $e_1$ is advantageously a curve described by the equation in polar coordinates (with pole S):

$$\rho = a\sqrt{\theta}$$

$\rho$ being the radius vector, $\theta$ the polar angle measured in radians, and $a$ a constant.

The equation of the spiral $e'_1$ is accordingly:

$$\rho = a\sqrt{\theta \pm \pi}$$

In a spectrometer fitted with windows according to FIG. 8, the angular position of the stationary window is immaterial. Consequently the question of adjusting this position does not arise. Either window or both may rotate.

During the rotation, a flux variation is provided throughout the area of the window; accordingly the value of the signal supplied by the detector receiving the exit flux is not very sensitive to heterogeneities in the degree of illumination.

This window may be used in a spectrometer in which modulation is accomplished by vibration. In such a spectrometer as well, the angular orientation of the stationary window with respect to the spectrum-spread direction is immaterial, and the quality of the signal modulation is not noticeably affected by small differences in the angular adjustment of the two windows.

Figure 9:
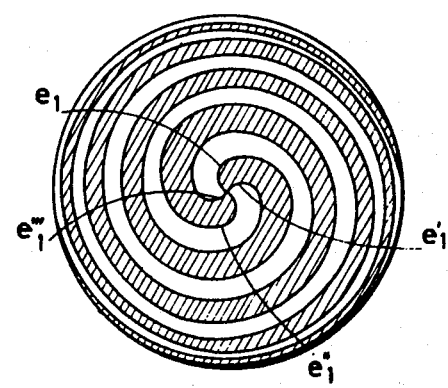

Let us now refer to FIG. 9. In this embodiment, starting from a first spiral $e_1$, advantageously with the same equation as above, I have plotted a second spiral $e'_1$ shifted by $\pi/2$ with respect to the first one, then a third spiral $e''_1$ shifted again by $\pi/2$, then a fourth spiral $e'''_1$ shifted again by $\pi/2$ with respect to the preceding one. A spectrometer fitted with windows according to FIG. 9 exhibits properties similar to those of a spectrometer fitted with windows according to FIG. 8, but with a modulation frequency which, for the same relative rotary velocity of the two windows or grids, is doubled.

In the same way one may realize windows with zone boundary lines constituted by a family of 2N spirals of general equation:

$$\rho = a\sqrt{\theta \pm \frac{\pi}{N}}$$

Figure 10:
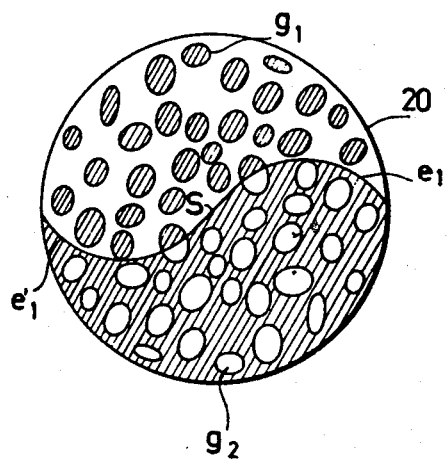

N being an integer. Thus, the angular spacing of adjacent spirals is an aliquot fraction of a $2\pi$;

Reference is now made to FIG. 10. In order to obtain this embodiment, one draws out a first curved line $e_1$ which constitutes a path from the point S to a point of the circumference 20; a second zone boundary line $e'_1$ is an image of line $e_1$ with respect to the point S. Furthermore the window includes a multiplicity of spots $g$ which may be identical and randomly distributed; the contours of these spots constitute zone boundary lines; to each spot $g_1$ with given conveying characteristics corresponds a spot $g_2$, symmetrical to the spot $g_1$ with respect to the center S, which has opposite conveying characteristics. The paths $e_1$ and $e'_1$ are a series of zone boundary lines hence, the spots which they intersect have different conveying characteristics on opposite sides of those lines.

Figure 11:
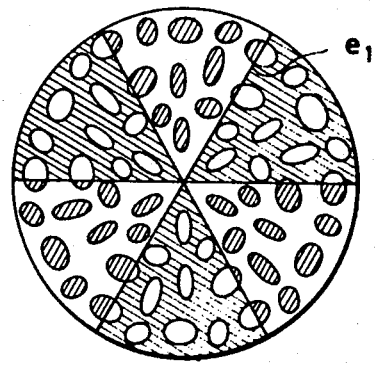

FIG. 11 relates to another embodiment is similar to the preceding one, except that the first line $e_1$ is a straight line, and that the symmetry is of order 6 ($N=3$). The spots are again randomly distributed, and the lines $e_1$ constitute zone boundary lines which separate zones with different conveying characteristics, whether these zones are constituted by the background of the window or else by spots.

Reference is now made to FIG. 12, which shows diagrammatically a spectrometric apparatus comprising an entrance window 30, as above described, a dispersive device 31, adjustable as to wavelengths and, an exit window 32. The radiation flux $r_1$ impinges on the entrance window 30, from which a flux $r_2$ is conveyed to the dispersive device 31; the radiation flux $r_3$ provided by the dispersive device 31 impinges on the exit window 32 and the exit flux $r_4$ of the apparatus is converted into an electric signal by a transducer 33 whose output is connected to an AC amplifier 34. Either or both gates or windows 30, 32 are movable, through means diagrammatically shown by arrows 35 and 36, with a periodical motion. The movement of the window occurs in the plane thereof; it is a continuous rotation about the center of the window, or alternatively a vibration, either rectilinear or circular. The amplifier 34 is tuned to the frequency of the movement or a multiple thereof.

I claim:

1. A device adapted to be utilized as a radiation gate in a spectrometric apparatus having a pair of such gates disposed at the input and at the output, respectively, of a projection system which includes dispersion means for casting upon the output gate the image of the input gate as projected with a predetermined wavelength of incident radiation; said device comprising a substantially plane window element with an even number of generally spiral curves of identical configuration extending outwardly from a common point to a circular periphery centered on said point, each of said curves constituting a boundary between two zones of different conveying characteristics for said radiation, the angular spacing of adjacent curves being an aliquot fraction of $2\pi$.

2. A device as defined in claim 1 wherein said zones diminish progressively in width with increasing distances from said point.

3. A device as defined in claim 2 wherein each of said curves is substantially defined in polar coordinates by the formula $$\rho = a\sqrt{\theta \pm \frac{\pi}{N}}$$

wherein $\rho$ is the radius vector originating at said point, $\theta$ is the polar angle in radians, $N$ is an integer and $a$ is a constant.